(12) United States Patent
Eswarakrishnan et al.

(10) Patent No.: US 7,497,936 B2
(45) Date of Patent: Mar. 3, 2009

(54) ELECTRODEPOSITABLE COATING COMPOSITIONS AND RELATED METHODS

(75) Inventors: Venkatachalam Eswarakrishnan, Allison Park, PA (US); Alan J. Kaylo, Glenshaw, PA (US); Gregory J. McCollum, Gibsonia, PA (US); Ellor James Van Buskirk, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 854 days.

(21) Appl. No.: 10/677,019

(22) Filed: Oct. 1, 2003

(65) Prior Publication Data

US 2004/0069637 A1   Apr. 15, 2004

Related U.S. Application Data

(60) Provisional application No. 60/415,146, filed on Oct. 1, 2002.

(51) Int. Cl.
*C25D 13/10* (2006.01)

(52) U.S. Cl. .................. 204/501; 204/505; 522/415

(58) Field of Classification Search .......... 204/501, 204/505; 523/415
See application file for complete search history.

(56) References Cited

U.S. PATENT DOCUMENTS

| | | | |
|---|---|---|---|
| 4,785,068 A | 11/1988 | Tominaga et al. ............. 528/45 |
| 4,789,696 A | 12/1988 | Paar et al. .................... 523/414 |
| 4,904,361 A | 2/1990 | Motohashi et al. ....... 204/181.7 |
| 4,981,924 A | 1/1991 | Nichols et al. .............. 525/528 |
| 5,116,914 A | 5/1992 | Chung et al. ................ 525/528 |
| 5,330,839 A | 7/1994 | Yasuoka et al. ............. 428/413 |
| 5,356,529 A | 10/1994 | Eswarakrishnan et al. .. 205/224 |
| 5,630,922 A * | 5/1997 | Eswarakrishnan et al. .. 204/499 |
| 5,718,817 A | 2/1998 | Bossert et al. ............. 204/501 |
| 5,767,191 A | 6/1998 | Zawacky et al. ........... 524/591 |
| 5,880,178 A | 3/1999 | Bossert et al. ............. 523/404 |
| 5,948,229 A * | 9/1999 | Zwack et al. ............... 204/502 |
| 6,042,893 A * | 3/2000 | Bossert et al. ............. 427/472 |
| 6,123,822 A | 9/2000 | Chung et al. ............... 204/489 |
| 6,174,422 B1 * | 1/2001 | Honig et al. ............... 204/499 |
| 6,265,079 B1 * | 7/2001 | Nishiguchi et al. ......... 428/457 |
| 6,761,973 B2 * | 7/2004 | Nishiguchi et al. ......... 428/418 |

FOREIGN PATENT DOCUMENTS

| | | |
|---|---|---|
| EP | 0509437 A1 | 1/1992 |
| GB | 2228935 A | 9/1990 |
| JP | 5271582 | 10/1993 |
| WO | WO 98/07795 | 2/1998 |

* cited by examiner

*Primary Examiner*—Kishor Mayekar
(74) *Attorney, Agent, or Firm*—Robert A. Diaz

(57) ABSTRACT

Provided is an electrodepositable coating composition of a resinous phase dispersed in an aqueous medium, the resinous phase including (a) an active hydrogen-containing, cationic salt group-containing resin; and (b) an at least partially blocked polyisocyanate curing agent. The composition contains an organotin catalyst which is or is derived from a dialkyltin compound having the structure (I):

$$[R_1][R_2]\text{—Sn}=\text{O} \quad\quad (I)$$

where $R_1$ and $R_2$ are the same or different, and each independently represents a monovalent hydrocarbon group wherein the sum of the carbon atoms in $R_1$ and $R_2$ is greater than 8. The catalyst is present in an amount sufficient to effect cure at a temperature at or below 340° F. (171.1° C.). Methods of preparing and using the composition also are provided.

27 Claims, No Drawings

ELECTRODEPOSITABLE COATING COMPOSITIONS AND RELATED METHODS

CROSS-REFERENCE TO RELATED APPLICATIONS

This application claims the benefit of priority of U.S. Provisional Patent Application Ser. No. 60/415,146, filed Oct. 1, 2002.

BACKGROUND OF THE INVENTION

I. Field of the Invention

The present invention relates to cationic electrodepositable coating compositions comprising a hydroxyl group-containing cationic resin, a blocked polyisocyanate curing agent, and an organotin catalyst; to methods of preparing such compositions; and to methods for applying such compositions.

II. Technical Considerations

The application of a coating by electrodeposition involves deposition of a film-forming composition to an electrically conductive substrate under the influence of an applied electrical potential. Electrodeposition has gained prominence in the coating industry because in comparison with non-electrophoretic coating methods, electrodeposition provides higher paint utilization, excellent corrosion resistance and low environmental contamination. Early attempts at commercial electrodeposition processes used anionic electrodeposition where the workpiece to be coated serves as the anode. However, cationic electrodeposition has become increasingly popular and today is the most prevalent method of electrodeposition.

Many cationic electrodeposition compositions in use today are based on active hydrogen-containing resins derived from a polyepoxide and a capped or blocked polyisocyanate curing agent. Typically, these cationic electrodeposition compositions also contain organotin catalysts to lower the temperature at which the blocking agent is released from blocked polyisocyanate and to activate cure of the electrodeposition composition.

Common organotin catalysts include dialkylltin oxides, for example, dibutyltin oxide, dioctyltin oxide and dimethyltin oxide, and derivatives thereof, such as dibutyltin dicarboxylates and dibutyltin mercaptides. Although effective to some degree in promoting cure of the electrodeposition composition, the use of such catalysts in cationic electrodeposition compositions can present several drawbacks. For example, most of the common dialkyltin oxides are high melting, amorphous solid materials which must be introduced into the composition in the form of a catalyst paste prepared by dispersing the solid catalyst into a pigment wetting resin under extremely high shear conditions. Preparation of stable catalyst pastes can be very costly and time intensive.

Further, it has been noted that some of the aforementioned organotin catalysts can cause a multitude of surface defects in the cured electrodeposited coating composition. For example, dibutyltin oxide dispersions can flocculate in the electrodeposition bath, resulting in oversized dibutyltin oxide agglomerates or particles which can settle in areas of the electrodeposition tank where agitation is poor. This flocculation phenomenon constitutes a loss of catalyst from the coating composition resulting in poor cure response. Moreover, the flocculate particles can settle in the uncured electrodeposited coating causing localized "hot spots" or pinholes in the surface of the cured coating. Also, electrodeposition bath stability can be adversely affected with the use of some organotin catalysts. It has been observed that soft, floating foams can form from a mixture of organotin catalyst, polyisocyanate curing agent and microscopic air bubbles.

Known in the art for use as catalysts in cationic electrodepositable coating compositions are the condensation products of dialkyltin oxides, such as dibutyltin oxide, and hydroxyl compounds such as aliphatic alcohols, alkanolamines, and phenols. These catalysts purportedly are storage stable and the organophilic molecule segments thereof enable them to stay in the resinous phase and, thus, in the dewatered film.

Also, known in the art for use as catalysts in cationic electrodepositable coating compositions are dialkyltin aromatic carboxylic acid salts prepared by reacting a dialkyltin oxide, such as dibutyltin oxide, with an aromatic carboxylic acid. Such catalysts are said to be more compatible with the resinous binder system, provide improved bath stability, and yield a coated film free from defects such as cratering and seeding. Further, a catalytic effect can be observed at lower temperatures than with the corresponding dialkyltin oxides, and cured films have improved corrosion resistance. Such catalysts can also be used in conjunction with bismuth and/or zirconium compounds to provide a cationic electrocoating composition having superior corrosion resistance, low-temperature curability and good electrodeposition bath stability.

Carboxylic acid and mercapto derivatives of dialkyltin oxides, for example diorganotin bis-carboxylates and diorganotin bis-mercaptides are also known in the art as catalysts for cationic electrodepositable coating compositions. The diorganotin bis-carboxylates can be prepared by reacting a dialkyltin oxide with the appropriate hydroxy-carboxylic acid or mercaptan. It is alleged that the use of such compounds as catalysts in cationic electrodepositable compositions can prevent problems associated with catalyst volatility and provide emulsion stability by becoming chemically bound via hydroxy-functionality to one or more of the composition components. However, with lower carboxylic acid derivatives, such as acetate, formate and laurate, the organotin derivative can hydrolyze and form the corresponding diorganotin oxide precipitate. The liberation of these low molecular weight carboxylic acids also can lower the throwpower of the electrodepositable composition, and can increase corrosion of the anode. Cautious incorporation of higher carboxylic acid derivatives such as dibutyltin dioleate, provide electrodeposition coating compositions with improved stability, however free acid from the at least partial hydrolysis of these organotin compounds can negatively affect coating performance when applied over galvanized steel substrates. It has been noted that with these higher carboxylic acid derivatives, the higher acid can remain in the film after curing, and can migrate to the zinc-electrodeposition coating interface causing adhesion loss and poor corrosion resistance.

Alkyltin diacetyl acetonates, for example dibutyltin diacetyl acetonate, have been employed as catalysts for curing components of cationic electrodeposition coatings containing a blocked polyisocyanate curing agent. Such catalysts typically are added in solution to a blend of an epoxy amine adduct and a blocked polyisocyanate curing agent, prior to dispersion into water. The alkyltin diacetyl acetonate catalysts purportedly are readily dispersed and remain dispersed in aqueous electrocoating baths. The art teaches that such materials are hydrolytically stable for extended periods of time under conventional electrocoating conditions. However, in practice, it is known in the art that some hydrolysis can occur, resulting in reformation of the dialkyltin oxide and the acetyl acetonate. The acetyl acetonate can react readily with any primary amine present in the cationic composition as a result of the reaction of a ketimine-containing compound with epoxy groups of a main film-forming resin, thereby forming high molecular weight species. In such instances, coating appearance can be adversely affected due to the presence of dialkyltin oxide precipitates and particles of the high molecular weight species resulting from reaction of primary amine and acetyl acetonate.

Triorganotin compounds are known for use as catalysts in electrodepositable coating compositions comprised of an active hydrogen-containing resin and a blocked polyisocyanate curing agent. For example, it is known to use triorganotin compounds such as bis (tributyltin) oxide, bis (trioctyltin) oxide, bis (tributyltin) sulfide, and bis (trioctyltin) adipate, which preferably are in liquid form at room temperature. These materials are easily incorporated into the electrodepositable composition and have good catalytic activity even at relatively low levels and at temperatures below 150° C. Such triorganotin compound, however, have been observed to have poor cure response when used in conjunction with resinous components having phenolic hydroxyl groups. Moreover, some trialkyltin compounds, for example, tributyltin compounds, are known to be volatile at typical curing temperatures. Also, some trialkyltin compounds can be toxic. Further, many triorganotin compounds typically have the disadvantage of high cost.

In view of the foregoing, it would be advantageous to provide a cationic electrodepositable coating composition containing an organotin catalyst which overcomes the problems encountered with prior art compositions containing such catalysts as discussed above. These problems are solved by the electrodepositable compositions of the present invention wherein the organotin catalyst can be incorporated into the resinous phase without the necessity of a grinding or milling operation. Such compositions demonstrate improved storage stability and cure response at lower cure temperatures, without compromising cured film appearance and performance properties.

SUMMARY OF THE INVENTION

In one embodiment, the present invention is directed to an improved electrodepositable coating composition comprising a resinous phase dispersed in an aqueous medium, the resinous phase comprising: (a) an active hydrogen-containing, cationic salt group-containing resin; and (b) an at least partially blocked polyisocyanate curing agent. The improvement comprises the inclusion in the electrodepositable coating composition of an organotin catalyst for effecting cure between the resin (a) and the curing agent (b). The organotin catalyst is or is derived from a dialkyltin compound having the following structure (I):

[R$_1$][R$_2$]—Sn=O    (I)

where $R_1$ and $R_2$ are the same or different, and each independently represents a monovalent hydrocarbon group wherein the sum of the carbon atoms in $R_1$ and $R_2$ is greater than 8. The catalyst is present in the electrodepositable coating composition in an amount sufficient to effect cure of the electrodepositable composition at a temperature at or below 340° F. (171.1° C.).

In accordance with the present invention further provided is an improved method for preparing an electrodepositable coating composition comprising a resinous phase dispersed in an aqueous medium, the resinous phase comprising: (a) an active hydrogen-containing, cationic salt group-containing resin; (b) an at least partially blocked polyisocyanate curing agent; and (c) an organotin catalyst for effecting the cure of the resin (a) and the curing agent (b). The method comprises the steps of (1) preparing the resin (a) from a mixture of reactive components; (2) preparing the at least partially blocked polyisocyanate curing agent (b) separate from the resin (a) by reacting a polyisocyanate and a blocking agent; (3) admixing the resin (a) and the curing agent (b) to form a resinous admixture; (4) blending an organic and/or inorganic acid with the resinous admixture to form an acidified admixture; and (5) dispersing the acidified admixture of (4) in an aqueous medium. The improvement comprises incorporating the organotin catalyst (c) into the mixture of reactive components during the preparation of the resin (a) in step (1), wherein the catalyst (c) is or is derived from a dialkyltin compound having the structure (I) above where $R_1$ and $R_2$ are as described above for that structure, the catalyst being present in the electrodepositable coating composition in an amount sufficient to effect cure of the composition at a temperature at or below 340° F. (171.1° C.).

The present invention also is directed to an improved method of electrocoating a conductive substrate serving as a cathode in an electrical circuit comprising said cathode and an anode, said cathode and anode being immersed in an aqueous electrocoating composition. The method comprises passing electric current between said cathode and anode to cause deposition of the electrocoating composition onto the substrate as a substantially continuous film, the aqueous electrocoating composition comprising a resinous phase dispersed in an aqueous medium. The resinous phase comprises: (a) an active hydrogen group-containing, cationic group-containing electrodepositable resin, and (b) an at least partially blocked polyisocyanate curing agent. The improvement comprises the inclusion in the electrocoating composition of an organotin catalyst for effecting cure between the resin (a) and the curing agent (b), where the catalyst is or is derived from a dialkyltin compound having the structure (I) where $R_1$ and $R_2$ are as described above for that structure. The catalyst is present in the electrocoating composition in an amount sufficient to effect cure of the electrocoating composition at a temperature at or below 340° F. (171.1° C.).

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

As previously mentioned, the present invention is directed to an improved electrodepositable coating composition comprising a resinous phase dispersed in an aqueous medium, the resinous phase comprising: (a) an active hydrogen-containing, cationic salt group-containing resin; and (b) an at least partially blocked polyisocyanate curing agent. The improvement comprises the inclusion in the electrodepositable coating composition of an organotin catalyst for effecting cure between the resin (a) and the curing agent (b).

The organotin catalyst is or is derived from a dialkyltin compound having the following structure (I):

$$[R_1][R_2]\text{—Sn}=O \quad (I)$$

where $R_1$ and $R_2$ are the same or different, and each independently represents a monovalent hydrocarbon group wherein the sum of the carbon atoms of $R_1$ and $R_2$ is greater than 8.

In one embodiment of the present invention, $R_1$ and $R_2$ can be the same or different, and each independently represents a monovalent hydrocarbon group having at least 4 carbon atoms, provided that at least one of $R_1$ and $R_2$ represents a monovalent hydrocarbon group having greater than 4 carbon atoms. The catalyst is present in the electrodepositable coating composition in an amount sufficient to effect cure of the electrodepositable composition at a temperature at or below 340° F. (171.1° C.).

As used herein, a "monovalent hydrocarbon group" means a monovalent group having a backbone repeat unit based exclusively on carbon. As used herein, "monovalent" refers to a substituent group that, as a substituent group, forms only one single, covalent bond. As used herein, "hydrocarbon groups" are intended to encompass both branched and unbranched hydrocarbon groups. Thus, when referring to a "monovalent hydrocarbon group," the hydrocarbon group can be branched or unbranched, acyclic or cyclic, saturated or unsaturated, and can contain from 1 to 24 (or in the case of an aromatic group from 3 to 24) carbon atoms. Nonlimiting examples of such hydrocarbon groups include alkyl, alkoxy, aryl, alkaryl, and alkoxyaryl groups. Nonlimiting examples of lower alkyl groups include, for example, methyl, ethyl, propyl, and butyl groups. As used herein, "lower alkyl" refers to alkyl groups having from 1 to 6 carbon atoms. One or more of the hydrogen atoms of the hydrocarbon can be substituted with heteroatoms. As used herein, "heteroatoms" means elements other than carbon, for example, oxygen, nitrogen, and halogen atoms.

In an embodiment of the present invention, one or both of $R_1$ and $R_2$ can represent a monovalent hydrocarbon group having greater than 4 carbon atoms, and typically 8 or more carbon atoms.

Non-limiting examples of organotin catalysts suitable for use in the cationic electrodepositable coating compositions of the present invention include dibenzyltin oxide, dioctyltin oxide, diisopentyltin oxide, dihexyltin oxide, diisoamyltin oxide, and mixtures thereof. In a particular embodiment of the present invention, the organotin catalyst comprises dioctyltin oxide and/or its derivatives, for example, dioctyltin acetate which is the reaction product of dioctyltin oxide with one mole of acetic acid.

As previously mentioned, derivatives of the dialkyltin compound having the structure (I) above are also suitable as catalysts for the electrodepositable coating composition of the present invention. Suitable such derivatives include but are not limited to dialkyltin carboxylates, for example the condensation products of dioctyltin oxide and carboxylic acids, for example short chain carboxylic acids such as acetic, lactic, formic, and propionic acids; and long chain carboxylic acids such as oleic, palmitic, stearic and myristic acids. Other suitable organotin derivatives include dialkyltin phenoxides, dialkyltin mercaptides, and dialkyltin alkoxides.

In a particular embodiment of the present invention, the ratio of equivalents of organic acid arising from the hydrolysis of a carboxylic acid derivative of the organotin catalyst relative to the equivalents of organotin compound present in the electrodepositable composition is no more than 2.0, and typically no more than 1.0. It has been observed that while carboxylic acid derivatives of the organotin oxide catalyst provide advantages for ease of handling and ease of incorporation into the electrodepositable composition, such materials can be undesirable because the carboxylic acid generated upon hydrolysis of the organotin carboxylate can lower the composition pH, adversely affect throwpower of the composition and promote bacterial infestation of the bath.

It should be understood that for purposes of the present invention, the organotin catalyst can comprise one or more of the dialkyltin compounds having the structure (I) above, one or more derivatives thereof, and mixtures thereof, provided the composition is storage stable as discussed below, and provided that the catalyst is present in an amount sufficient to effect cure of the electrodepositable composition at a temperature at or below 340° F. (171.1° C.).

The organotin catalyst described in detail above can be present in the electrodepositable coating composition of the present invention in an amount of at least 0.1 percent by weight tin based on weight of total resin solids present in the electrodepositable coating composition. Also, the organotin catalyst can be present in the electrodepositable coating composition of the present invention in an amount less than or equal to 5.0 percent by weight tin, often less than or equal to 3.0 percent by weight tin, and typically less than or equal to 1.0 percent by weight tin based on weight of total resin solids present in the electrodepositable coating composition. The level of organotin catalyst present in the electrodepositable coating composition can range between any combination of these values, inclusive of the recited values, provided that the catalyst is present in an amount sufficient to effect cure (as determined by a method described in detail below) of the composition at a temperature at or below 340° F. (171.1° C.).

As used herein, the term "cure" as used in connection with a composition, e.g., "composition when cured" or a "cured composition", shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a TA Instruments DMA 2980 DMTA analyzer conducted under nitrogen. This method determines the glass transition temperature and crosslink density of free films of coatings or polymers. These physical properties of a cured material are related to the structure of the crosslinked network. In an embodiment of the present invention, the sufficiency of cure is evaluated relative to the solvent resistance of the cured film. For example, solvent resistance can be measured by determining the number of double acetone rubs. For purposes of the present invention, a coating is deemed to be "cured" when the film can withstand a minimum of 100 double acetone rubs without substantial softening of the film and no removal of the film.

As aforementioned, in addition to the organotin catalyst and/or derivatives thereof, the electrodepositable coating composition of the present invention comprises (a) an active hydrogen-containing, cationic salt group-containing resin, and (b) an at least partially blocked polyisocyanate curing agent.

The cationic resin (a) typically is derived from a polyepoxide and can be prepared by reacting together a polyepoxide and a polyhydroxyl group-containing material selected from alcoholic hydroxyl group-containing materials and phenolic hydroxyl group-containing materials to chain extend or build the molecular weight of the polyepoxide. The reaction product can then be reacted with a cationic salt group former to produce the cationic resin.

A chain extended polyepoxide typically is prepared as follows: the polyepoxide and polyhydroxyl group-containing material are reacted together neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction typically is conducted at a temperature of 80° C. to 160° C. for 30 to 180 minutes until an epoxy group-containing resinous reaction product is obtained.

The equivalent ratio of reactants; i.e., epoxy:polyhydroxyl group-containing material is typically from 1.00:0.50 to 1.00:2.00.

The polyepoxide typically has at least two 1,2-epoxy groups. In general the epoxide equivalent weight of the polyepoxide will range from 100 to about 2000, typically from about 180 to 500. The epoxy compounds may be saturated or unsaturated, cyclic or acyclic, aliphatic, alicyclic, aromatic or heterocyclic. They may contain substituents such as halogen, hydroxyl, and ether groups.

Examples of polyepoxides are those having a 1,2-epoxy equivalency greater than one and preferably about two; that is, polyepoxides which have on average two epoxide groups per molecule. The preferred polyepoxides are polyglycidyl ethers of polyhydric alcohols such as cyclic polyols. Particularly preferred are polyglycidyl ethers of polyhydric phenols such as Bisphenol A. These polyepoxides can be produced by etherification of polyhydric phenols with an epihalohydrin or dihalohydrin such as epichlorohydrin or dichlorohydrin in the presence of alkali. Besides polyhydric phenols, other cyclic polyols can be used in preparing the polyglycidyl ethers of cyclic polyols. Examples of other cyclic polyols include alicyclic polyols, particularly cycloaliphatic polyols such as 1,2-cyclohexane diol and 1,2-bis(hydroxymethyl)cyclohexane. The preferred polyepoxides have epoxide equivalent weights ranging from about 180 to 2000, preferably from about 186 to 1200. Epoxy group-containing acrylic polymers can also be used. These polymers typically have an epoxy equivalent weight ranging from about 750 to 2000.

Examples of polyhydroxyl group-containing materials used to chain extend or increase the molecular weight of the polyepoxide (i.e., through hydroxyl-epoxy reaction) include alcoholic hydroxyl group-containing materials and phenolic hydroxyl group-containing materials. Examples of alcoholic hydroxyl group-containing materials are simple polyols such as neopentyl glycol; polyester polyols such as those described in U.S. Pat. No. 4,148,772; polyether polyols such as those described in U.S. Pat. No. 4,468,307; and urethane diols such as those described in U.S. Pat. No. 4,931,157. Examples of phenolic hydroxyl group-containing materials are polyhydric phenols such as Bisphenol A, phloroglucinol, catechol, and resorcinol. Mixtures of alcoholic hydroxyl group-containing materials and phenolic hydroxyl group-containing materials may also be used. Bisphenol A is preferred.

The resin contains cationic salt groups, which can be incorporated into the resin molecule as follows: The resinous reaction product prepared as described above is further reacted with a cationic salt group former. By "cationic salt group former" is meant a material which is reactive with epoxy groups and which can be acidified before, during, or after reaction with the epoxy groups to form cationic salt groups. Examples of suitable materials include amines such as primary or secondary amines which can be acidified after reaction with the epoxy groups to form amine salt groups, or tertiary amines which can be acidified prior to reaction with the epoxy groups and which after reaction with the epoxy groups form quaternary ammonium salt groups. Examples of other cationic salt group formers are sulfides which can be mixed with acid prior to reaction with the epoxy groups and form ternary sulfonium salt groups upon subsequent reaction with the epoxy groups.

When amines are used as the cationic salt formers, monoamines typically are employed, and hydroxyl-containing amines are particularly preferred. Polyamines may be used but are not recommended because of a tendency to gel the resin.

Tertiary and secondary amines are preferred to primary amines because primary amines are polyfunctional with respect to epoxy groups and have a greater tendency to gel the reaction mixture. If polyamines or primary amines are used, they should be used in a substantial stoichiometric excess to the epoxy functionality in the polyepoxide so as to prevent gelation and the excess amine should be removed from the reaction mixture by vacuum stripping or other technique at the end of the reaction. The epoxy may be added to the amine to ensure excess amine.

Examples of hydroxyl-containing amines include alkanolamines, dialkanolamines, alkyl alkanolamines, and aralkyl alkanolamines containing from 1 to 18 carbon atoms, preferably 1 to 6 carbon atoms in each of the alkanol, alkyl and aryl groups. Specific examples include ethanolamine, N-methylethanolamine, diethanolamine, N-phenylethanolamine, N,N-dimethylethanolamine, N-methyldiethanolamine, 3-aminopropyldiethanolamine, and N-(2-hydroxyethyl)-piperazine.

Amines such as mono, di, and trialkylamines and mixed aryl-alkyl amines which do not contain hydroxyl groups or amines substituted with groups other than hydroxyl which do not negatively affect the reaction between the amine and the epoxy may also be used. Specific examples include ethylamine, methylethylamine, triethylamine, N-benzyldimethylamine, dicocoamine, 3-dimethylaminopropylamine, and N,N-dimethylcyclohexylamine.

Mixtures of the above mentioned amines may also be used.

The reaction of a primary and/or secondary amine with the polyepoxide takes place upon mixing of the amine and polyepoxide. The amine may be added to the polyepoxide or vice versa. The reaction can be conducted neat or in the presence of a suitable solvent such as methyl isobutyl ketone, xylene, or 1-methoxy-2-propanol. The reaction is generally exothermic and cooling may be desired. However, heating to a moderate temperature of about 50 to 150° C. may be done to hasten the reaction.

The reaction product of the primary and/or secondary amine and the polyepoxide is made cationic and water dispersible by at least partial neutralization with an acid. Suitable acids include organic and inorganic acids. Nonlimiting examples of suitable organic acids include formic acid, acetic acid, and lactic acid. Nonlimiting examples of suitable inorganic acids include phosphoric acid and sulfamic acid. By "sulfamic acid" is meant sulfamic acid itself or derivatives thereof; i.e., an acid of the formula:

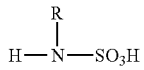

wherein R is hydrogen or an alkyl group having 1 to 4 carbon atoms. Sulfamic acid is preferred. Mixtures of the above mentioned acids may also be used.

The extent of neutralization of the cationic electrodepositable composition varies with the particular reaction product involved. However, sufficient acid should be used to disperse the electrodepositable composition in water. Typically, the amount of acid used provides at least 20 percent of all of the total neutralization. Excess acid may also be used beyond the amount required for 100 percent total neutralization.

In the reaction of a tertiary amine with a polyepoxide, the tertiary amine can be pre-reacted with the neutralizing acid to form the amine salt and then the amine salt reacted with the polyepoxide to form a quaternary salt group-containing resin. The reaction is conducted by mixing the amine salt with the polyepoxide in water. Typically, the water is present in an amount ranging from about 1.75 to about 20 percent by weight based on total reaction mixture solids.

In forming the quaternary ammonium salt group-containing resin, the reaction temperature can be varied from the lowest temperature at which the reaction will proceed, generally room temperature or slightly thereabove, to a maximum temperature of about 100° C. (at atmospheric pressure). At higher pressures, higher reaction temperatures may be used. Preferably, the reaction temperature is in the range of about 60 to 100° C. Solvents such as a sterically hindered ester, ether, or sterically hindered ketone may be used, but their use is not necessary.

In addition to the primary, secondary, and tertiary amines disclosed above, a portion of the amine that is reacted with the polyepoxide can be a ketimine of a polyamine, such as is described in U.S. Pat. No. 4,104,147, column 6, line 23 to column 7, line 23. The ketimine groups decompose upon dispersing the amine-epoxy resin reaction product in water. In an embodiment of the present invention, at least a portion of the active hydrogens present in the resin (a) comprise primary amine groups derived from the reaction of a ketimine-containing compound and an epoxy group-containing material such as those described above.

In addition to resins containing amine salts and quaternary ammonium salt groups, cationic resins containing ternary sulfonium groups may be used in the composition of the present invention. Examples of these resins and their method of preparation are described in U.S. Pat. No. 3,793,278 to DeBona and U.S. Pat. No. 3,959,106 to Bosso et al.

It should be understood that the active hydrogens associated with the cationic resin include any active hydrogens which are reactive with isocyanates at temperatures sufficient to cure the electrodepositable composition as previously discussed, i.e., at temperatures at or below 340° F (171.1° C.). The active hydrogens typically are derived from reactive hydroxyl groups, and primary and secondary amino, including mixed groups such as hydroxyl and primary amino. In one embodiment of the present invention, at least a portion of the active hydrogens are derived from hydroxyl groups comprising phenolic hydroxyl groups. The cationic resin can have an active hydrogen content of 1 to 4 milliequivalents, typically 2 to 3 milliequivalents of active hydrogen per gram of resin solids.

The extent of cationic salt group formation should be such that when the resin is mixed with an aqueous medium and other ingredients, a stable dispersion of the electrodepositable composition will form. By "stable dispersion" is meant one that does not settle or is easily redispersible if some settling occurs. Moreover, the dispersion should be of sufficient cationic character that the dispersed resin particles will electrodeposit on a cathode when an electrical potential is set up between an anode and a cathode immersed in the aqueous dispersion.

Generally, the cationic resin in the electrodepositable composition of the present invention contains from about 0.1 to 3.0, preferably from about 0.1 to 0.7 milliequivalents of cationic salt group per gram of resin solids. The cationic resin typically is non-gelled, having a number average molecular weight ranging from about 2000 to about 15,000, preferably from about 5000 to about 10,000. By "non-gelled" is meant that the resin is substantially free from crosslinking, and prior to cationic salt group formation, the resin has a measurable intrinsic viscosity when dissolved in a suitable solvent. In contrast, a gelled resin, having an essentially infinite molecular weight, would have an intrinsic viscosity too high to measure.

The active hydrogen-containing, cationic salt group-containing resin (a) can be present in the electrodepositable composition of the present invention in an amount ranging from 40 to 95 weight percent, typically from 50 to 75 weight percent based on weight of total resin solids present in the composition.

The electrodepositable composition of the present invention also contains an at least partially blocked polyisocyanate curing agent. The polyisocyanate curing agent may be a fully blocked polyisocyanate with substantially no free isocyanate groups, or it may be partially blocked and reacted with the resin backbone as described in U.S. Pat. No. 3,984,299. The polyisocyanate can be an aliphatic or an aromatic polyisocyanate or a mixture of the two. Diisocyanates are preferred, although higher polyisocyanates can be used in place of or in combination with diisocyanates.

Examples of suitable aliphatic diisocyanates are straight chain aliphatic diisocyanates such as 1,4-tetramethylene diisocyanate, norbornane diisocyanate, and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylmethane-4,4'-diisocyanate and 2,4- or 2,6-toluene diisocyanate. Examples of suitable higher polyisocyanates are triphenylmethane-4,4', 4"-triisocyanate, 1,2,4-benzene triisocyanate and polymethylene polyphenyl isocyanate, and trimers of 1,6-hexamethylene diisocyanate.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used. A mixture of diphenylmethane-4,4'-diisocyanate and polymethylene polyphenyl isocyanate is preferred.

Any suitable alcohol or polyol can be used as a blocking agent for the polyisoycanate in the electrodepositable composition of the present invention provided that the agent will deblock at the curing temperature and provided a gelled product is not formed. Any suitable aliphatic, cycloaliphatic, or aromatic alkyl alcohol may be used as a blocking agent for the polyisocyanate including, for example, lower aliphatic monoalcohols such as methanol, ethanol, and n-butanol; cycloaliphatic alcohols such as cyclohexanol; aromatic-alkyl alcohols such as phenyl carbinol and methylphenyl carbinol. Glycol ethers may also be used as blocking agents. Suitable glycol ethers include ethylene glycol butyl ether, diethylene glycol butyl ether, ethylene glycol methyl ether and propylene glycol methyl ether. Diethylene glycol butyl ether is preferred among the glycol ethers.

In one embodiment of the present invention, the blocking agent comprises one or more 1,3-glycols and/or 1,2-glycols. In one embodiment of the present invention, the blocking agent comprises one or more 1,2-glycols, typically one or more $C_3$ to $C_6$ 1,2-glycols. For example, the blocking agent can be selected from at least one of 1,2-propanediol, 1,3-butanediol, 1,2-butanediol, 1,2-pentanediol and 1,2-hexanediol. It has been observed that the presence of such blocking agents facilitates dissolution or dispersion of the organotin catalyst in the resinous phase or components thereof.

Other suitable blocking agents include oximes such as methyl ethyl ketoxime, acetone oxime and cyclohexanone oxime and lactams such as epsilon-caprolactam.

The polyisocyanate curing agent (b) is usually present in the electrodepositable composition in an amount ranging from about 5 to 60 percent by weight, typically from about 25 to 50 percent by weight based on total weight of resin solids.

It should be understood that any of the previously described organotin catalysts, that is organotin catalysts having the structure (I) above, derivatives thereof, and mixtures thereof, can be incorporated into the electrodepositable composition of the present invention by any method or means provided that the stability of the composition is not compromised. For example, the organotin catalyst can be admixed with or dispersed in the reactants used to form the resin (a) during preparation of the resin (a). Also, the organotin catalyst can be admixed with or dispersed in one or more of the reactants used to form the resin (a) prior to resin preparation. In addition, the organotin catalyst can be admixed with or dispersed in the resin (a) either prior to or subsequent to neutralization with an acid. The organotin catalyst also can be admixed with or dispersed in the at least partially blocked polyisocyanate curing agent (b) prior to combining the resin (a) and the curing agent (b). Further, the organotin catalyst can be admixed with or dispersed in the admixture of the resin (a) and the curing agent (b). Alternatively, the organotin catalyst can be added to any of the optional additives, solvents, or adjuvant resinous materials as described below prior to addition of the optional ingredients to the composition. Also, the organotin catalyst can be directly admixed with or dispersed in the aqueous medium, prior to dispersion of the resinous phase in the aqueous medium. The organotin catalyst also can be added neat to the electrodepositable composition subsequent to dispersion in the aqueous medium. Additionally, if desired, the organotin catalyst can be added on-line to the electrodeposition bath in the form of an additive material. It should be understood that the catalyst can be incorporated into the electrodepositable composition by one or more of the above described methods.

The electrodepositable composition may optionally contain a coalescing solvent such as hydrocarbons, alcohols, esters, ethers and ketones. Examples of preferred coalescing solvents are alcohols, including polyols, such as isopropanol, butanol, 2-ethylhexanol, ethylene glycol and propylene glycol; ethers such as the monobutyl and monohexyl ethers of ethylene glycol; and ketones such as methyl isobutyl ketone and isophorone. The coalescing solvent is usually present in an amount up to 40 percent by weight, typically ranging from about 0.05 to 25 percent by weight based on total weight of the electrodepositable composition.

The electrodepositable composition of the present invention may further contain pigments and various other optional additives such as plasticizers, surfactants, wetting agents, defoamers, and anti-cratering agents, as well as adjuvant resinous materials different from the resin (a) and the curing agent (b). These optional ingredients, when present, are usually used in an amount up to 30 percent by weight, typically about 1 to 20 percent by weight based on weight of resin solids.

Suitable pigments include, but are not limited to, iron oxides, lead oxides, carbon black, coal dust, titanium dioxide, talc, clay, silica, and barium sulfate, as well as color pigments such as cadmium yellow, cadmium red, chromium yellow, and the like. The pigment content of the aqueous dispersion, generally expressed as the pigment to resin (or pigment to binder) ratio (P/B) is usually 0.05:1 to 1:1. In a particular embodiment, the electrodepositable coating composition of the present invention is free of lead-containing compounds.

The electrodepositable coating composition of the present invention is used in an electrodeposition process in the form of an aqueous dispersion. By "dispersion" is meant a two-phase transparent, translucent, or opaque aqueous resinous system in which the resin, pigment, and water insoluble materials are in the dispersed phase while water and water-soluble materials comprise the continuous phase. The dispersed phase has an average particle size of less than 10 microns, and can be less than 5 microns. The aqueous dispersion can contain at least 0.05 and usually 0.05 to 50 percent by weight resin solids, depending on the particular end use of the dispersion.

The electrodepositable compositions of the present invention in the form of an aqueous dispersion have excellent storage stability, that is, upon storage at a temperature of 140° F. (60° C.) for a period of 14 days, the compositions are stable. By "stable dispersion" is meant herein that the resinous phase and the organotin catalyst remain uniformly dispersed throughout the aqueous phase of the composition. Upon storage under the conditions described above, the dispersions do not flocculate or form a hard sediment. If over time some sedimentation occurs, it can be easily redispersed with low shear stirring.

In the process of electrodeposition the electrodepositable composition of the present invention in the form of an aqueous dispersion is placed in contact with an electrically conductive anode and cathode, where the substrate serves as the cathode. Upon passage of an electric current between the anode and cathode while they are in contact with the aqueous dispersion, an adherent film of the electrodepositable composition will deposit in a substantially continuous manner on the cathode. The film will contain the active hydrogen-containing resin, the blocked polyisocyanate curing agent, the organotin catalyst, and the optional additives from the non-aqueous phase of the dispersion.

It should be noted herein that the organotin catalyst is characterized in that the catalyst is substantially non-volatile at the curing temperature, that is, at temperatures at or below 340° F. (171.1° C.). By "substantially non-volatile" is meant that the catalyst does not volatilize from the film into the curing oven environment at these temperatures during the curing process.

Electrodeposition is usually carried out at a constant voltage in the range of from about 1 volt to several thousand volts, typically between 50 and 500 volts. Current density is usually between 1.0 ampere and 15 amperes per square foot (10.8 to 161.5 amperes per square meter) and tends to decrease quickly during the electrodeposition process, indicating formation of a continuous self-insulating film. Any electroconductive substrate known in the art, especially metal substrates such as steel, zinc, aluminum, copper, magnesium or the like can be coated with the electrodepositable composition of the present invention. Steel substrates are preferred. It is customary to pretreat the substrate with a phosphate conversion, usually a zinc phosphate conversion coating, followed by a rinse which seals the conversion coating.

After deposition, the coating is heated to cure the deposited composition. The heating or curing operation can be carried out at a temperature in the range of from 250 to 400° F. (121.1 to 204.4° C.), typically from 300 to 340° F. (148.8 to 171.1° C.) for a period of time ranging from 1 to 60 minutes. The thickness of the resultant film typically can range from 10 to 50 microns.

The invention will be further described by reference to the following examples. Unless otherwise indicated, all parts and percentages are by weight.

EXAMPLES

Example A describes the prepartion of a crosslinker used to prepare the resinous binders of Examples D and G; Example B describes the preparation of a crosslinking used to prepare the resinous binder of Example E; Example C describes the preparation of an additive resin used in the preparation of the binders of Examples D and G. Examples D, E, and F describe the preparation of cationic resinous binders used in the electrodepositable coating compositions of the present invention. Example G describes the preparation of a catalyst-free cationic resin. Examples 1 through 4 describe the preparation of electrodepositable coating compositions of the present invention. Comparative Examples 5 and 6 describe the preparation of cationic electrodepositable coating composition comprising dibutyltin oxide and trioctyltin oxide, respectively.

Example A

This example describes the preparation of a crosslinker used in Examples D and G. The crosslinker was prepared as follows:

| Ingredients | Parts by weight (in grams) |
| --- | --- |
| Ethanol | 92.0 |
| Propylene glycol | 456.0 |
| Polyol[1] | 739.5 |
| Methylisobutyl ketone | 476.5 |
| MAZON ® 1651[2] | 92.8 |
| DESMODUR ® LS 2096[3] | 42.1 |
| Methylisobutyl ketone | 76.5 |

[1]Bisphenol A/6 ethylene oxide adduct available from BASF Corporation as MACOL ® 98B.
[2]Plasticizer available from BASF Corporation.
[3]Isocyanate available from Bayer Corporation.

The ethanol, propylene glycol, polyol, first charge of methylisobutyl ketone and MAZON 1651 were added to a reaction flask. The DESMODUR LS 2096 was added slowly beginning at approximately 25° C., allowing the reaction to exotherm to 105° C., while not exceeding 110° C. The reaction was held at this temperature until IR analysis showed that all isocyanate had been consumed.

Example B

This example describes the preparation of a crosslinker used in the resin of Example E.

| Ingredients | Parts by weight (in grams) |
| --- | --- |
| 1,2-butanediol | 3274.61 |
| Methylisobutyl ketone | 1170.65 |
| Dibutyltin dilaurate | 4.04 |
| PAPI ® 2940[1] | 4796.4 |
| Methylisobutyl ketone | 254.35 |

[1]Polymeric MDI available from Dow Chemicals.

The 1,2-butanediol, methylisobutyl ketone and dibutyltin dilaurate were charged to a reaction flask under a nitrogen atmosphere and heated to 30° C. To this solution was added PAPI 2940 slowly, keeping the reaction temperature below 80° C. Upon completion of the addition, the second charge of methylisobutyl ketone was added and the mixture held at 85° C. until IR analysis indicated no unreacted NCO remained.

Example C

This example describes the preparation of an additive resin, used in the resins of Examples D and G. The additive was prepared from the following ingredients:

| Ingredients | Parts by weight (in grams) |
| --- | --- |
| MAZEEN 355 70[1] | 603.3 |
| Acetic acid | 5.9 |
| Dibutyltin dilaurate | 0.66 |
| Toluene diisocyanate | 87.17 |
| Sulfamic acid | 38.79 |
| Deionized water | 1289 |

[1]Aminediol available from BASF Corporation.

The acetic acid was added to the MAZEEN 355 70 and mixed thoroughly for 10 minutes. The dibutyltin dilaurate was then added and the solution mixed. The toluene diisocyanate was added slowly, controlling the exotherm to 100° C. maximum. When the diisocyanate addition was complete, the solution was held at 100° C. until no isocyanate was present as determined by IR analysis. Sulfamic acid was added and the solution was mixed well. The deionized water was added slowly and the mixture was mixed well to yields a dispersion having a solids content of 36% after 1 hour at 110° C.

Example D

An electrodepositable resin containing dioctyltin oxide was prepared from the following ingredients:

| Ingredients | Parts by weight (in grams) |
| --- | --- |
| Crosslinker of Example A | 988.3 |
| MAZON 1651 | 57.1 |
| EPON 828[1] | 528.7 |

-continued

| Ingredients | Parts by weight (in grams) |
|---|---|
| Bisphenol A | 203.9 |
| TETRONIC ® 150R1[2] | 0.173 |
| Diethanolamine | 36.1 |
| Aminopropyl diethanolamine | 79.2 |
| EPON 828 | 5.74 |
| Dioctyltin oxide | 25.71 |
| Sulfamic acid | 29.8 |
| Deionized water | 1001 |
| Lactic acid, 88% in water | 1.16 |
| Additive of Example C | 126.5 |
| Gum rosin solution[3] | 14.1 |
| Deionized water | 1045 |

[1]Epoxy resin available from Resolution Performance Products.
[2]Surfactant available from BASF Corporation.
[3]A solution of 30% by weight abietic acid in MAZON 1651.

The crosslinker, MAZON 1651, EPON 828, bisphenol A and TETRONIC 150R1 were charged to a 4-neck round bottom flask fitted with a Dean-Stark trap, under a nitrogen atmosphere. The mixture was heated to 75° C. and the diethanolamine was added. The mixture was stirred for 30 minutes, during which time an exotherm to 80° C. was observed. The aminopropyl diethanolamine was added and the temperature was raised to 132° C. The mixture was held at this temperature for 90 minutes while collecting 29.3 g of solvent in the Dean-Stark trap. The second charge of EPON 828 was added and the mixture was held for an additional hour at 132° C. The mixture was cooled to 100° C., the dioctyltin oxide was added, and the mixture was held for 30 minutes. 1630 g of this mixture was poured into a premixed solution of the sulfamic acid, the first charge of deionized water, the lactic acid and the additive of Example B under vigorous agitation. The gum rosin solution was added and the mixture stirred for 30 minutes. The final charge of deionized water was added and mixed in well. The mixture was distilled under vacuum to remove solvent and a portion of the water. The solids content of the resultant dispersion was adjusted to approximately 40% by addition of deionized water.

Example E

An electrodepositable resin containing dioctyltin oxide was prepared from the following ingredients:

| Ingredients | Parts by weight (in grams) |
|---|---|
| EPON 880[1] | 461.01 |
| Polyol described in Example A | 93.75 |
| Bisphenol A | 199.07 |
| Methylisobutyl ketone | 15.38 |
| Ethyltriphenyl phosphonium iodide | 0.45 |
| Polyol described in Example A | 93.75 |
| Methylisobutyl ketone | 28.00 |
| Crosslinker of Example B | 862.53 |
| Diketimine[2] | 42.75 |
| N-methylethanolamine | 36.51 |
| Dioctyltin oxide | 21.18 |
| Sulfamic acid | 29.14 |
| Deionized water | 1024.58 |
| Gum rosin solution of Example D | 14.24 |

| Ingredients | Parts by weight (in grams) |
|---|---|
| Deionized water | 592.88 |
| Deionized water | 600.68 |

[1]An epoxy resin available from Resolution Performance Products.
[2]The reaction product of diethylenetriamine and methylisobutyl ketone, 73% solids in methylisobutyl ketone.

The EPON 828, initial charge of polyol, bisphenol A and the initial charge of methylisobutyl ketone were charged to a reaction vessel and heated under a nitrogen atmosphere to 125° C. Ethyltriphenyl phosphonium iodide then was added and the reaction mixture allowed to exotherm to approximately 145° C. The reaction was held at 145° C. for 2 hrs and the second charge of polyol was added. The reaction was then cooled to 125° C. and the second charge of methylisobutyl ketone, the crosslinker of Example B, the diketimine and N-methylethanolamine were added in succession. The mixture was allowed to exotherm and then a temperature of 122° C. was established. The mixture was held at 122° C. for 2 hours. The dioctyltin oxide then was added and the reaction mixture was stirred for 15 minutes at 122° C. The resin mixture (1600 parts) was dispersed in aqueous medium by adding it to a mixture the sulfamic acid and the first charge of deionized water. After 30 minutes, the gum rosin solution was added and the dispersion was further thinned with the last two charges of deionized water in stages. The dispersion was vacuum stripped to remove organic solvent to give a dispersion having a solids content of 43.58 percent after 1 hour at 110° C.

Example F

An electrodepositable resin containing dioctyltin oxide was prepared from the following ingredients:

| Ingredients | Parts by weight (in grams) |
|---|---|
| DER732[1] | 711 |
| n-Butyl ether of ethylene glycol | 12.1 |
| Bisphenol A | 164.5 |
| Benzyldimethyl amine | 1.65 |
| n-Butyl ether of ethylene glycol | 164.5 |
| JEFFAMINE ® D400[2] | 184.7 |
| EPON 828 | 19.5 |
| n-Butyl ether of ethylene glycol | 3.0 |
| Dioctyltin oxide | 161.9 |
| Acetic acid | 22.5 |
| Deionized water | 972.1 |
| Sulfamic acid | 33.6 |
| Deionized water | 1519 |

[1]Aliphatic epoxy resin available from Dow Chemical Company.
[2]A polyoxypropylene diamine available from Huntsman Corporation.

The DER732, n-butyl ether of ethylene glycol, and bisphenol A were charged to a flask. The mixture was heated to 130° C. and the benzyldimethyl amine was added. The reaction mixture was held at 135° C. until the epoxide equivalent weight of the mixture was 1232. The second charge of n-butyl ether of ethylene glycol was added and the mixture was cooled to 95° C. The JEFFAMINE D400 was added and the reaction held at 95° C. until the Gardner-Holdt viscosity of a 50% solution of the resin diluted in methoxy propanol was "J". A mixture of the EPON 828 and third charge of n-butyl ether of ethylene glycol was added and the mixture held until the Gardner-Holdt viscosity of a 50% solution of the resin diluted in methoxy propanol was "P+". The dioctyltin oxide and acetic acid were added and the mixture was stirred for 20 minutes to dissolve the dioctyltin oxide. The resulting resin (1138 parts) was poured into a mixture of the first charge of deionized water and sulfamic acid under agitation and mixed for 30 minutes. The final charge of deionized water was added and the dispersion was mixed well. The final aqueous dispersion had a measured solids content of 29.7% after 1 hour at 110° C.

Example G

A catalyst-free electrodepositable resin composition was prepared from the following ingredients:

| Ingredients | Parts by weight (in grams) |
| --- | --- |
| Crosslinker of Example A | 988.3 |
| MAZON 1651 | 57.1 |
| EPON 828 | 528.6 |
| Bisphenol A | 209.3 |
| TETRONIC ® 150R1 | 0.173 |
| Diethanolamine | 36.1 |
| Aminopropyl diethanolamine | 79.2 |
| EPON 828 | 5.74 |
| Sulfamic acid | 29.8 |
| Deionized water | 1001 |
| Lactic acid, 88% in water | 1.16 |
| Additive of Example C | 126.5 |
| Gum rosin solution | 14.1 |
| Deionized water | 1045 |

The crosslinker, MAZON 1651, EPON 828, bisphenol A and TETRONIC 150R1 were charged to a 4-neck round bottom flask fitted with a Dean-Stark trap, under a nitrogen atmosphere. The mixture was heated to 75° C. and the diethanolamine was added. The mixture was stirred for 30 minutes, during which time an exotherm to approximately 80° C. was observed. The aminopropyl diethanolamine was added and the temperature was raised to 132° C. The mixture was held at this temperature for 90 minutes while collecting 29.3 parts of solvent in the Dean-Stark trap. The second charge of EPON 828 was added and the mixture was held for an additional hour at 132° C. 1630 parts of this mixture was poured into a mixture of the sulfamic acid, the first charge of deionized water, the lactic acid and the additive of Example B under vigorous agitation. The gum rosin solution was added and the mixture stirred for 30 minutes. The final charge of deionized water was added and mixed in well. The mixture was distilled under vacuum to remove solvent. The solids content of the resultant dispersion was adjusted to approximately 40% by addition of deionized water.

Paint Examples

Example 1

This example describes the preparation of a pigment paste suitable for use in the electrodeposition paint compositions for Examples 2, 3, 4, and 6. The pigment paste was prepared from the following ingredients:

| Ingredients | Parts by weight (in grams) |
| --- | --- |
| Cationic resin[1] | 9970.4 |
| MAZON 1651 | 1153.2 |
| Propylene glycol monobutyl ether | 1027.7 |
| SURFYNOL ® GA[2] | 242.3 |
| Titanium dioxide[3] | 12,000 |
| Carbon black[4] | 113.1 |
| Clay[5] | 4037.7 |
| Deionized water | 6758 |

[1]As prepared in U.S. Pat. No. 6,190,525, Example C.
[2]A surfactant available from Air Products and Chemicals, Inc.
[3]Available from Kerr-McGee Corp. as CR-800E.
[4]Available from Degussa Corp. as PRINTEX ® 200.
[5]Available from Engelhard Corp. as ASP-200.

The above ingredients were added in the order shown under high shear agitation. After the ingredients were thoroughly blended, the pigment paste was transferred to a horizontal sand mill and ground to a Hegman value >7.0. The pigment paste was then collected. The measured solids were 59.5% following one hour@ 110° C.

Example 2

A cationic electrodepositable coating composition was prepared from the following ingredients:

| Ingredients | Parts by weight (in grams) |
| --- | --- |
| Resin of Example D | 1635.6 |
| Pigment paste of Example 1 | 246.5 |
| MAZON 1651 | 51.4 |
| 4.5% Yttrium acetate[1] | 96.6 |
| Deionized water | 1759.2 |

[1]A solution prepared by mixing 112.9 g yttrium trioxide, 5568 g water and 180.1 g acetic acid at 97° C. until homogeneous.

Under moderate agitation the MAZON 1651 was added to the pigment paste of Example 1. The yttrium acetate solution was then added after diluting it with 400 g of deionized water. This mixture was added to the resin of Example D after reducing it with 200 g of water under agitation. The remaining amount of water was then added. The composition was allowed to stir for at least 4 hours, then ultrafiltered 20%.

Example 3

A cationic electrodepositable coating composition was prepared from the following ingredients:

| Ingredients | Parts by weight (in grams) |
| --- | --- |
| Resin of Example E | 936.7 |
| Pigment paste of Example 1 | 155.7 |
| MAZON 1651 | 32.5 |
| Propylene glycol monomethyl ether | 24 |
| 4.5% Yttrium acetate of Example 2 | 61 |
| Deionized water | 1214.1 |

Under moderate agitation the MAZON 1651 and propylene glycol monomethyl ether were added to the pigment paste of Example 1. The yttrium acetate solution was then added after diluting it with 400 g of water. This mixture was added to the resin of Example E after reducing it with 200 g of water under agitation. The remaining amount of water was then added. The composition was allowed to stir for at least 4 hours, then ultrafiltered 20%.

Example 4

A cationic electrodepositable coating composition was prepared from the following ingredients:

| Ingredients | Parts by weight (in grams) |
| --- | --- |
| Resin of Example G | 882.5 |
| Resin of Example F | 152.3 |
| Pigment paste of Example 1 | 137.4 |
| MAZON 1651 | 26.4 |
| Ethylene glycol monohexyl ether | 12 |
| 4.5% Yttrium acetate of Example 2 | 61 |
| Deionized water | 1128.4 |

The resin of Example F was reduced with 200 g of water, then added to the resin of Example G. In a separate vessel under moderate agitation, the MAZON 1651 and ethylene glycol monohexyl ether were added to the pigment paste of Example 1, and the yttrium acetate solution was then added after diluting it with 400 g of water. This mixture was then added to the blend of resins of Examples F and G under agitation, followed by the remaining amount of water. The composition was allowed to stir for at least 4 hours, then ultrafiltered 20%.

Example 5

Comparative (Dibutyltin Oxide Control)

A cationic electrodeposition coating composition was prepared from the following ingredients:

| Ingredients | Parts by weight (in grams) |
| --- | --- |
| E6300[1] | 1957.6 |
| E6301[2] | 242.1 |
| Deionized water | 1808.3 |

[1] A resin blend available from PPG Industries.
[2] A pigment paste containing dibutyltin oxide catalyst, available from PPG Industries.

Under moderate agitation the pigment paste E6301 was diluted with 200 g of water and added to the resin blend E6300 after reducing it with 400 g of water. The remaining amount of water was then added. The paint was allowed to stir for at least 4 hours, then ultrafiltered 20%.

Example 6

Comparative (Trioctyltin Oxide Control)

| Ingredients | Parts by weight (in grams) |
| --- | --- |
| Resin of Example G | 1020.5 |
| Pigment paste of Example 1 | 155.7 |
| Trioctyltin oxide | 7.6 |
| MAZON 1651 | 32.5 |
| 4.5% Yttrium acetate of Example 2 | 61 |
| Deionized water | 1122.7 |

Under moderate agitation the trioctyltin oxide and MAZON 1651 were added to the pigment paste of Example 1. The yttrium acetate solution was then added after diluting it with 400 g of water. This mixture was added to the resin of Example G after reducing it with 200 g of water under agitation. The remaining amount of water was then added. The composition was allowed to stir for at least 4 hours, then ultrafiltered 20%.

Example 7

A dibutyltin diacetate-containing resin solution was prepared by stirring the following ingredients together:

| Ingredients | Parts by weight (in grams) |
| --- | --- |
| Resin of Example G | 150 |
| Dibutyltin diacetate | 0.76 |
| Deionized water | 183 |

Example 8

A trioctyltin oxide-containing resin solution was prepared by stirring the following ingredients together:

| Ingredients | Parts by weight (in grams) |
| --- | --- |
| Resin of Example G | 150 |
| Trioctyltin oxide | 1.04 |

Test Procedures

The electrodepositable coating compositions were electrodeposited on phosphated cold rolled steel, commercially available from ACT Laboratories. The time of electrodeposition was 2 minutes for each composition. Additional conditions of electrodeposition are presented in Table 1. The resulting films were cured at 320° F. for 20 minutes. The degree of cure was tested by double solvent rubs (DAR), in which a rag was soaked in acetone and rubbed over the film surface up to 200 times. These results are also reported in Table 1 as the number of double acetone rubs required to remove the cured paint.

TABLE 1

| Paint | Temperature of paint bath | Voltage | Film Build (mils) | DAR |
|---|---|---|---|---|
| Example 2 | 95° F. | 200 | 0.84 | >100 |
| Example 3 | 90° F. | 140 | 0.84 | >100 |
| Example 4 | 90° F. | 140 | 0.80 | >100 |
| Example 5 | 95° F. | 200 | 0.84 | >100 |
| Example 6 | 90° F. | 150 | 0.71 | <5 |

Resin Stability Testing

Stability was tested by placing 4 ounces of each tin catalyst-containing resin listed below at 140° F. for two weeks. These were compared to the same resin without a tin catalyst, noting visual appearance immediately after introduction of the tin species and after exposure to heat. Results are presented in below Table 2.

TABLE 2

| | | Appearance | |
|---|---|---|---|
| Resin | Catalyst | Initial | 2 weeks/140° F. |
| Example D | Dioctyltin oxide | No change | Very slight settle |
| Example 7 | Dibutyltin oxide | Fine white settle | ¼" fluffy white settle |
| Example 8 | Trioctyltin oxide | No change | Yellow oil separation |
| Example G | None | No change | No change |

The examples in Table 1 above demonstrate that electrodepositable coating compositions containing resins prepared with dioctyltin oxide (DOTO; Examples 2, 3 and 4) cure as well as a coating composition containing a tin catalyst that must be milled independently in order to be active. These compositions also exhibit cure response far superior a composition prepared by direct addition of the DOTO to the composition.

Additionally, it is demonstrated in Table 2 that resins made with DOTO (Example D) are more stable than resins containing liquid tin catalysts, which hydrolyze to inactive tin compounds.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. In a method for preparing an electrodepositable coating composition comprising a resinous phase dispersed in an aqueous medium, said resinous phase comprising:
    (a) an active hydrogen-containing, cationic salt group-containing resin;
    (b) an at least partially blocked polyisocyanate curing agent; and
    (c) an organotin catalyst for effecting the cure of the resin (a) and the curing agent (b),
   said method comprising the steps of
    (1) preparing the resin (a) from a mixture of reactive components in the absence of the aqueous medium;
    (2) preparing the at least partially blocked polyisocyanate curing agent (b) separate from the resin (a) by reacting a polyisocyanate and a blocking agent;
    (3) admixing the resin (a) and the curing agent (b) to form a resinous admixture;
    (4) blending an organic and/or inorganic acid with the resinous admixture to form an acidified admixture; and
    (5) dispersing the acidified admixture of (4) in the aqueous medium,
   the improvement comprising incorporating the organotin catalyst (c) into the mixture of reactive components during the preparation of the resin (a) in step (1),
   wherein the catalyst (c) comprises the following structure (I):

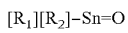

$$[R_1][R_2]\text{-Sn}=O \qquad (I)$$

where $R_1$ and $R_2$ are the same or different, and each independently represents a monovalent hydrocarbon group wherein the sum of the carbon atoms in $R_1$ and $R_2$ is greater than 8,
   said catalyst being present in the electrodepositable coating composition in an amount sufficient to effect cure of the electrodepositable composition at a temperature at or below 340° F. (171.1° C.); and
   wherein the resinous phase is not subjected to a grinding or milling operation;
   and wherein there is no other curing catalyst in the resinous phase.

2. The electrodepositable coating composition of claim 1, wherein at least one of $R_1$ and $R_2$ represents a monovalent hydrocarbon group having at least 4 carbon atoms, provided that at least one of $R_1$ and $R_2$ represents a monovalent hydrocarbon group having greater than 4 carbon atoms.

3. The method of claim 1, wherein the ratio of equivalents of organic carboxylic acid derived from the hydrolysis of an organotin carboxylate to the equivalents of organotin present in the electrodepositable composition is no more than 2.0.

4. The method of claim 1, wherein the ratio of equivalents of organic carboxylic acid derived from the hydrolysis of an organotin carboxylate to the equivalents of organotin present in the electrodepositable composition is no more than 1.0

5. The method of claim 1, wherein the resin (a) is prepared in step (1) by reacting
   a polyepoxide,
   a polyhydroxyl group-containing material at least a portion of which comprises phenolic hydroxyl groups, and
   a cationic salt group-former selected from the group consisting of amines and ketimines.

6. The method of claim 5, wherein the active hydrogens present in the resin (a) are derived from reactive hydroxyl groups at least a portion of which comprise phenolic hydroxyl groups, and/or primary amine groups derived from the reaction of a ketimine-containing compound and an epoxy-group containing material.

7. The method of claim 1, wherein the curing agent (b) is prepared in step (2) by reacting a polyisocyanate with a blocking agent comprising a $C_3$ to $C_{61,2}$-glycol.

8. The method of claim 1, wherein the catalyst (c) comprises dioctyltin oxide and/or its derivatives.

9. The method of claim 1, wherein the catalyst (c) is added during step (1) in an amount sufficient to provide 0.1 to 5.0 percent by weight tin based on weight of total resin solids present in the electrodepositable coating composition.

10. In a method of electrocoating a conductive substrate serving as a cathode in an electrical circuit comprising said cathode and an anode, said cathode and anode being immersed in an aqueous electrocoating composition,
    said method comprising passing electric current between said cathode and anode to cause deposition of the electrocoating composition onto the substrate as a substantially continuous film, the aqueous electrocoating composition comprising a resinous phase dispersed in an aqueous medium, said resinous phase comprising:

(a) an active hydrogen group-containing, cationic group-containing electrodepositable resin, and (b) at least partially blocked polyisocyanate curing agent, the improvement comprising the inclusion in the electrocoating composition of an organotin catalyst for effecting cure between the resin (a), and the curing agent (b), wherein said catalyst comprises the following structure (I):

[R₁][R₂]–Sn=O   (I)

where $R_1$ and $R_2$ are the same or different, and each independently represents a monovalent hydrocarbon group, wherein the sum of the carbon atoms of $R_1$ and $R_2$ is greater than 8, said catalyst being present in the electrocoating composition in an amount sufficient to effect cure of the electrocoating composition at a temperature at or below 340° F. (171.1° C.);

wherein the catalyst is dispersed in the resin (a) and/or the curing agent (b) of the resinous phase prior to the resinous phase being dispersed in the aqueous medium; wherein the resinous phase is not subjected to a grinding or milling operation; and wherein there is no other curing catalyst in the resinous phase.

11. The method of claim 10, wherein at least one of $R_1$ and $R_2$ represents a monovalent hydrocarbon group having greater than 4 carbon atoms, provided that at least one of $R_1$ and $R_2$ represents a monovalent hydrocarbon group having greater than 4 carbon atoms.

12. The method of claim 10, wherein the catalyst is present in the electrocoating composition in an amount sufficient to effect cure of the coating composition at or below a temperature of 320° F. (160° C.).

13. The method of claim 10, wherein the resin (a) comprises active hydrogens derived from reactive hydroxyl groups and/or primary amine groups.

14. The method of claim 13, wherein at least a portion of the hydroxyl groups comprise phenolic hydroxyl groups.

15. The method of claim 13, wherein the resin (a) is the reaction product of a polyepoxide and a polyhydric phenol.

16. The method of claim 10, wherein at least a portion of the active hydrogens present in the resin (a) comprise primary amine groups derived from the reaction of a ketimine-containing compound and an epoxy group-containing material.

17. The method of claim 10, wherein the curing agent (b) is at least partially blocked with a blocking agent comprising one or more 1,3-glycols and/or 1,2-glycols.

18. The method of claim 17, wherein the 1,2-glycol comprises a $C_3$ to $C_6$ 1,2-glycol.

19. The method of claim 17, wherein the curing agent (b) comprises a blocking agent selected from at least one of 1,2-propanediol, 1,2-butanediol, 1,3-butanediol, 1,2-pentanediol and 1,2-hexanediol.

20. The method of claim 10, wherein the resin (a) comprises reactive hydroxyl groups and/or primary amine groups, and the curing agent (b) is at least partially blocked with a blocking agent comprising one or more 1,2-glycols.

21. The method of claim 20, wherein at least a portion of the reactive hydroxyl groups comprise phenolic hydroxyl groups.

22. The method of claim 10, wherein the catalyst is substantially non-volatile at a temperature at or below 340° F. (171.1° C.).

23. The method of claim 10, wherein at least one of $R_1$ and $R_2$ represents a monovalent hydrocarbon group having 8 or more carbon atoms.

24. The method of claim 10, wherein the catalyst comprises dioctyltin oxide and/or its derivatives.

25. The method of claim 10, wherein the catalyst is present in the electrocoating composition in an amount ranging from 0.1 to 5.0 percent by weight of tin based on weight of total resin solids present in the electrocoating composition.

26. The method of claim 10, wherein the electrocoating composition is free of lead-containing compounds.

27. The method of claim 10, wherein the electrocoating composition further comprises at least one of a bismuth compound, and a zinc compound.

* * * * *

UNITED STATES PATENT AND TRADEMARK OFFICE
CERTIFICATE OF CORRECTION

PATENT NO.        : 7,497,936 B2 Page 1 of 1
APPLICATION NO.   : 10/677019
DATED             : March 3, 2009
INVENTOR(S)       : Venkatachalam Eswarakrishnan et al.

It is certified that error appears in the above-identified patent and that said Letters Patent is hereby corrected as shown below:

Claim 7
Column 22, Line 55
"$C_{6\ 1,2}$-glycol" should read "$C_6$ 1,2-glycol"

Signed and Sealed this

Seventh Day of September, 2010

David J. Kappos
*Director of the United States Patent and Trademark Office*